United States Patent
Kümper

(10) Patent No.: US 7,367,551 B2
(45) Date of Patent: May 6, 2008

(54) ELASTOMERIC BUSH BEARING WITH IMPROVED TORSION CHARACTERISTIC

(75) Inventor: Bernd Kümper, Rahden (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 11/142,097

(22) Filed: Jun. 1, 2005

(65) Prior Publication Data

US 2006/0001207 A1    Jan. 5, 2006

(30) Foreign Application Priority Data

Jun. 29, 2004   (DE) .................. 10 2004 031 559

(51) Int. Cl.
*B60G 11/22*    (2006.01)
(52) U.S. Cl. .................... 267/281; 267/141.2
(58) Field of Classification Search ........ 267/279–283; 384/222–275
See application file for complete search history.

(56) References Cited

U.S. PATENT DOCUMENTS

| | | | | |
|---|---|---|---|---|
| 3,159,391 | A * | 12/1964 | Barenyi et al. ............. | 267/294 |
| 3,322,475 | A * | 5/1967 | Schick ........................ | 384/138 |
| 3,331,642 | A | 7/1967 | Krauss | |
| 3,392,971 | A * | 7/1968 | Herbenar et al. ........... | 267/269 |
| 3,730,599 | A * | 5/1973 | Fingerle .................... | 384/475 |
| 3,781,073 | A * | 12/1973 | Jorn et al. ................. | 384/291 |
| 3,976,338 | A * | 8/1976 | Trachte et al. ............. | 384/220 |
| 4,707,149 | A * | 11/1987 | Hahle ........................ | 384/294 |
| 4,744,677 | A * | 5/1988 | Tanaka et al. ............. | 384/222 |
| 4,767,108 | A * | 8/1988 | Tanaka et al. ......... | 267/140.12 |
| 4,809,960 | A | 3/1989 | Kakimoto et al. | |
| 5,143,456 | A * | 9/1992 | Jordens et al. ............. | 384/275 |
| 5,286,014 | A * | 2/1994 | Chakko ...................... | 267/293 |
| 5,593,233 | A * | 1/1997 | Kammel et al. ............. | 384/222 |
| 6,170,812 | B1 * | 1/2001 | Nicoles ....................... | 267/281 |
| 6,363,613 | B1 * | 4/2002 | Wolf et al. ............... | 29/896.91 |

FOREIGN PATENT DOCUMENTS

| | | |
|---|---|---|
| DE | 1 271 565 | 6/1968 |
| DE | 40 36 051 C1 | 4/1992 |
| DE | 195 02 732 A1 | 11/1995 |

(Continued)

*Primary Examiner*—Chris Schwartz
(74) *Attorney, Agent, or Firm*—Norris McLaughlin & Marcus, PA

(57) ABSTRACT

The invention is directed to an elastomeric bush bearing. A bearing of this type is substantially unaffected by torsional loads and has a simple design. The proposed bush bearing includes, in a conventional manner, an inner sleeve formed as a hollow cylinder, a sleeve-like outer element surrounding the inner sleeve, and an elastomeric bearing support disposed between the inner sleeve and the outer element. The elastomeric bearing support is formed as two parts, having an inner bearing support and an outer bearing support, with an inner element enclosed between the inner and outer bearing support. For improving the torsion characteristic, the inner bearing support according to the invention is formed by at least one elastomeric formed part which is inserted from one axial end of the support between the inner sleeve and the inner element, which is connected with the outer bearing support. The formed part is held by a pressed-on annular disk, wherein a radially inner region of the disk extends into the inner sleeve forming a press fit. The formed part forms a sliding surface for the inner sleeve and the inner element.

12 Claims, 2 Drawing Sheets

FOREIGN PATENT DOCUMENTS

Figure 1:
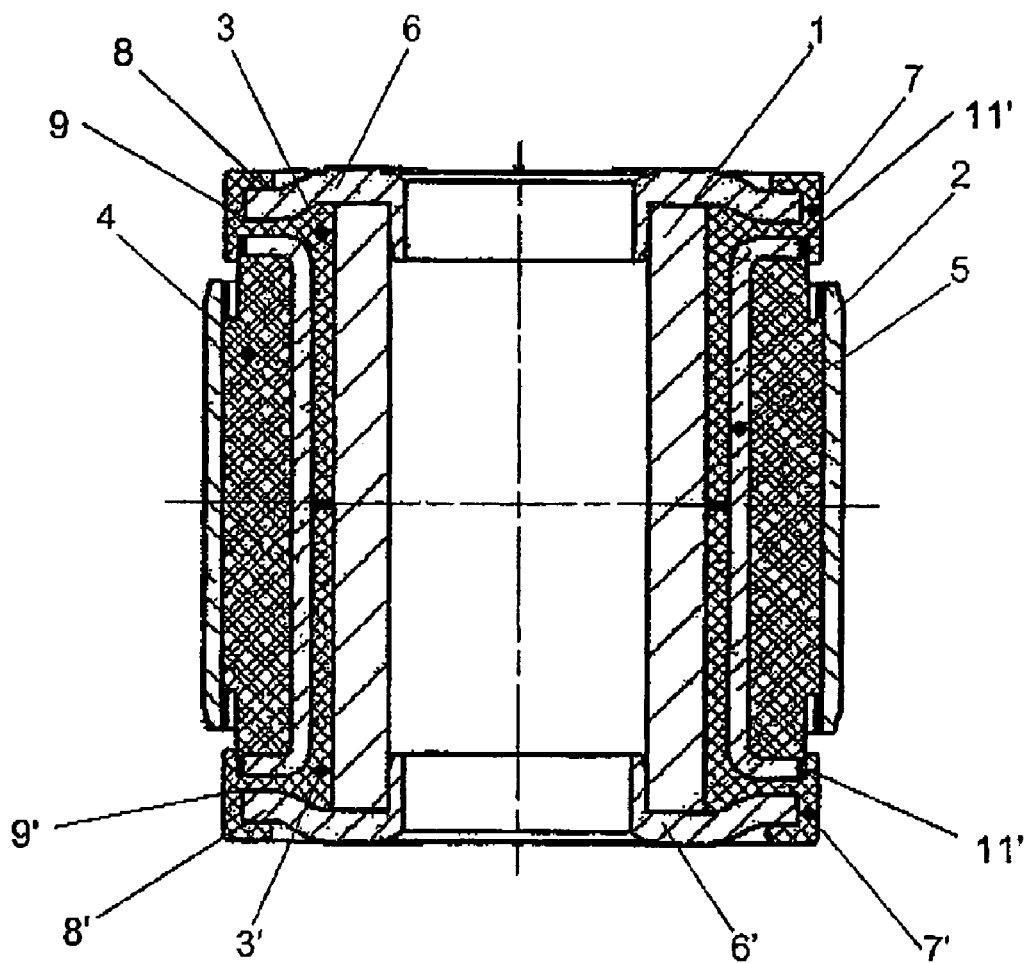

| | | |
|---|---|---|
| DE | 44 29 102 A1 | 2/1996 |
| EP | 0 213 543 A2 | 3/1987 |
| EP | 0 611 149 A1 | 8/1994 |
| FR | 000409704 A1 * | 7/1990 |
| JP | 61-127932 A | 6/1986 |
| JP | 01-199028 A | 8/1989 |

* cited by examiner

ELASTOMERIC BUSH BEARING WITH IMPROVED TORSION CHARACTERISTIC

BACKGROUND OF THE INVENTION

The invention is directed to an elastomeric bush bearing with improved torsion characteristic. It relates to a bearing of conventional design, with an inner sleeve formed as a hollow cylinder, a sleeve-like outer element concentrically or eccentrically surrounding the inner sleeve, and an interposed elastomeric bearing support which encloses an inner or insertion component.

Bush bearings of this type are frequently used particularly in the automobile industry. They are used to support the components of the wheel suspension and/or the transverse control arms. The bearings dampen the radially and axially introduced forces, such as forces produced by an uneven road surface, to keep noise and vibrations away from the passenger compartment. However, the bearings are not only subjected to radial and axial forces, but also to torsion. Conventional bearings have an inner sleeve encased with an injection-molded polyurethane (PUR) coating; alternatively, the elastomeric bearing support, preferably made of rubber, is fixedly connected with the inner sleeve through vulcanization. This causes a high torque in the bearing support under torsion, which severely stresses the bearing and can prematurely wear the bearing out. Disadvantageously, injection-molding PUR around the inner sleeve also requires contouring of the outer surface of the inner sleeve, typically with longitudinal and/or transverse grooves, to ensure that the PUR adheres to the inner sleeve. A plastic cap must also be pressed onto the end(s) of the bearing during installation to seal the bearing against external contamination.

Disadvantageously, this design must also have a certain play to prevent the inner element from jamming, which can also increase the torsional stress. A bearing of the aforedescribed type is disclosed, for example, in DE 44 291 02 A1.

Unlike the bearing described in the aforementioned German patent application, many of the conventional solutions also include an inner sleeve with a flange disposed on its axial end for sealing the bearing. An inner sleeve with this design, however, is more complex and expensive to manufacture. Moreover, a protective surface layer may have to be applied to the inner sleeve, to protect, in particular, the end face of the flange.

It is therefore an object of the invention to provide an elastomeric bush bearing which is greatly unaffected by torsional stress, which has a simple design and can be manufactured cost-effectively.

BRIEF SUMMARY OR THE INVENTION

The object is solved by an elastomeric bush bearing with the features of the independent claim. Advantageous embodiments and modifications of the bearing of the invention are recited in the dependent claims.

The proposed elastomeric bush bearing comprises, in an essentially conventional manner, an inner sleeve formed as a hollow cylinder, a sleeve-like outer element surrounding the inner sleeve, and an elastomeric bearing support disposed between the inner sleeve and the outer element. The elastomeric bearing support includes an inner bearing support and an outer bearing support. An inner element, which extends in the peripheral and axial direction, is enclosed between the inner and outer bearing support. The torsion characteristic can be improved and the bearing design simplified by forming the inner bearing support according to the invention by at least one elastomeric formed part which is inserted from one axial end of the support between the inner sleeve and the inner element. The inner element is connected with the outer bearing support, where it is held by a pressed-on annular disk. Advantageously, the formed part held by the pressed-on annular disk, which forms a corresponding slide plane for the inner sleeve and the inner element, respectively, is pretensioned. The deformation caused by the pressing operation causes a radially interior region of the annular disk to be partially drawn into the inner sleeve, where it abuts and forms a press fit with the inner contour of the inner sleeve.

According to an embodiment of the invention, the elastomeric formed part includes in the region of an axial bearing end a radially inwardly protruding peripheral bead with a U-shaped edge. The peripheral bead defines an external boundary of the annular disk, which is pressed onto the corresponding bearing end.

According to an advantageous embodiment, the inner bearing support of the proposed elastomeric bush bearing includes two identical elastomeric formed parts secured between the inner sleeve and the inner element, with the formed parts being pushed onto the inner sleeve from a respective axial bearing end. The elastomeric formed parts forming the inner bearing support are pretensioned relative to each other in the axial direction and supported by the annular disks.

Advantageously, the formed part(s) forming the inner bearing support is/are made of an elastomer, preferably rubber, with a high self-lubricating fraction According to an advantageous embodiment of the invention, the inside and/or outside of the formed part(s) include honeycombs, in which a lubricant, preferably grease, is incorporated. In this embodiment, the annular disk or disks also form a seal which prevents lubricant from exiting the bearing. The pressed-on annular disk functions simultaneously as an axial limit stop.

The bearing can also be implemented as a bearing with hydraulic damping, while retaining the basic bearing design of the invention. Two or more chambers, which are adapted to receive a liquid damping means and are connected by a channel, are then formed in the outer bearing support.

The inner sleeve is preferably made of a metallic material, for example cast aluminum, whereas various other materials can be used for the inner element that is connected with the outer bearing support, depending on the particular application. The inner element can be made of an aluminum sheet or a plastic material.

An embodiment of the invention will be hereinafter described in more detail. The corresponding drawings show in:

BRIEF DESCRIPTION OF THE SEVERAL VIEWS OF THE DRAWING(S)

Figure 2:
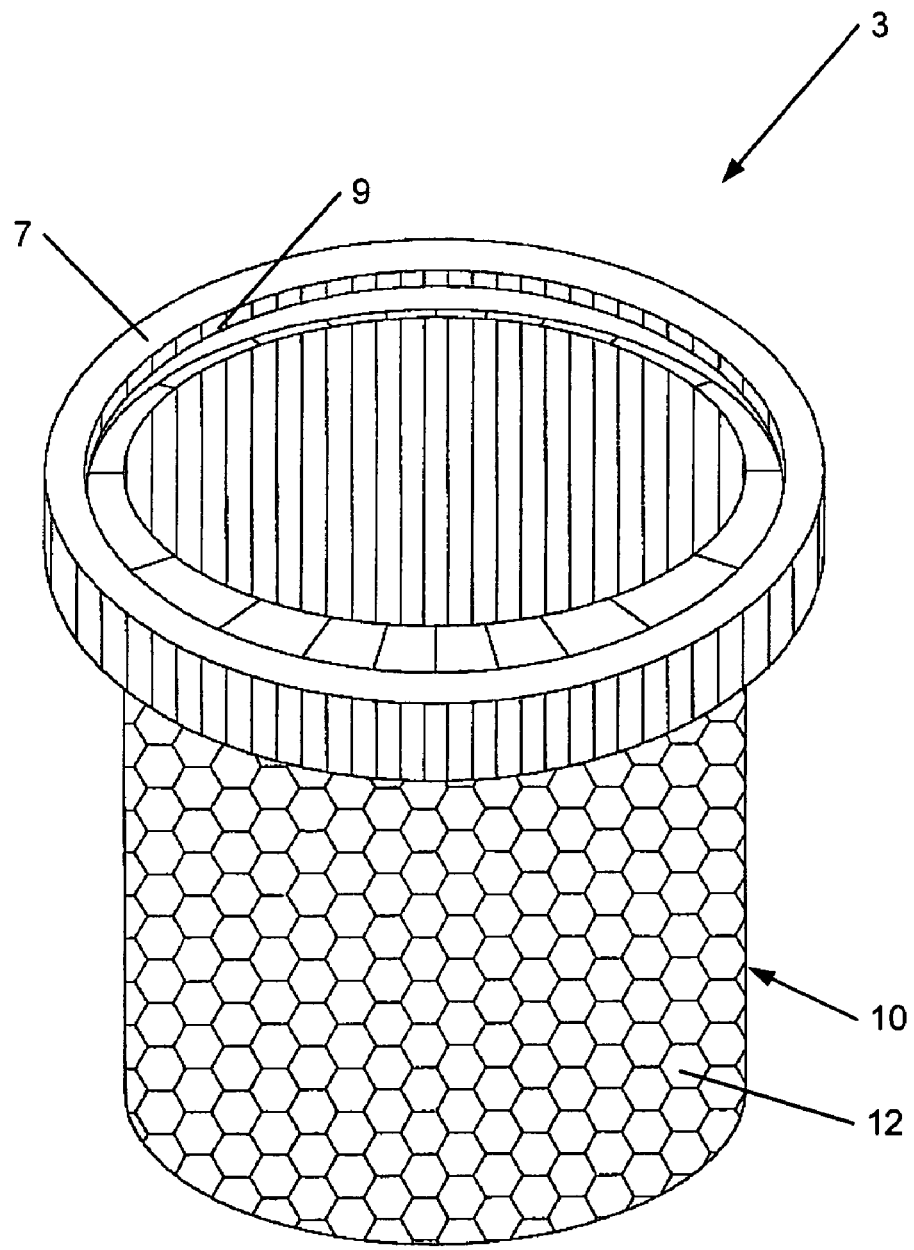

FIG. 1 an axial cross-sectional view of an embodiment of the bearing according to the invention, and FIG. 2 a perspective view of the elastomeric formed part forming the inner bearing support of the bearing of FIG. 1.

DETAILED DESCRIPTION OF THE INVENTION

The bearing shown in FIG. 1 in a cross-sectional view includes a metallic inner sleeve 1, an outer element 2 concentrically surrounding the inner sleeve 1, and an interposed bearing support 3, 3', 4, which surrounds an inner element 5. The outer element 2 is shown here also as a sleeve, although this need not necessarily be the case. In the radial direction, the bearing support 3, 3', 4 is formed as two parts, consisting of an inner bearing support 3, 3' and an outer bearing support 4. The inner element 5, which is connected with the outer bearing support, preferably through vulcanization, is disposed between the inner bearing support 3, 3' and the outer bearing support 4 and has on its ends respective outwardly pointing edges 11, 11'. According to the basic idea of the invention, the inner bearing support 3, 3' is formed from two special elastomeric formed parts. These are inserted between the inner sleeve 1 and the inner element 5 from the axial bearing ends and are held in place by two annular disks 6, 6' arranged on the respective bearing ends. The annular disks 6, 6' include respective radial outer shoulders 8, 8' formed near the periphery of the annular disks. In the region of the axial bearing ends, the elastomeric bearing supports 3, 3' include a peripheral bead 7, 7' with a U-shaped, radially inwardly protruding edge or groove 9, 9'. In this way, a peripheral boundary is defined for each of the annular disks 6, 6', which are pressed onto the bearing ends during manufacture. When the annular disks 6, 6' are pressed with their radially inner region into the inner sleeve 1, they are deformed, as seen from FIG. 1, and abut the inner contour by forming a press fit. The two formed parts 3, 3' of the depicted bearing are pretensioned against each other in the axial direction. In addition, when the annular disks 6, 6' are pressed on, the formed parts 3, 3' are pushed together, generating a radial pretension in particular in the region of the annular disks 6, 6' themselves. At the same time, the annular disks 6, 6' seal the bearing at the end faces.

FIG. 2 shows a perspective view of one of the elastomeric formed parts 3, 3' used in the bearing of FIG. 1 before installation of the bearing. As seen in FIG. 2, the formed part 3 has the shaped of a hollow cylinder. A peripheral bead 7 or projection is formed on one of its axial ends. A U-shaped, radially inwardly protruding edge 9 or groove 9 is formed on the peripheral bead 7, which forms a boundary for the outer shoulder 8 of annular disk 6 to be pressed on during installation of the bearing. The formed parts 3, 3' can be made of PUR or a similar material. According to an advantageous embodiment described above, they can also have on their inner and/or outer peripheral surface a honeycomb structure 10 or a similar structure adapted to receive a lubricant 12 or slip additive.

The sliding faces which are formed on the formed parts 3, 3' of the inner bearing support and face the inner sleeve 1 and to the inner element 5 allow essentially unlimited torsion, i.e., the bearing can be rotated at any angle without increasing wear. Advantageously, the simple design also reduces the manufacturing costs. For example, the inner sleeve 1 does not require longitudinal and transverse grooves to ensure adhesion, for example, of PUR, because the inner sleeve 1 does not need to be encapsulated by an injection-molded compound, thus eliminating a separate injection-molding operation. Advantageously, the inner sleeve 1, unlike most conventional bearings, does also not require a flange, which is here replaced the annular disk(s) (spacer) 6, 6'. The sleeve 1 therefore has a simpler geometry, which also reduces the manufacturing costs. A protective surface layer is also eliminated, since the inner sleeve 1 is completely surrounded by the bearing element 3, 3', 4, in particular in the region of the end faces.

Advantageously, the pressed-on annular disks 6, 6' simultaneously function as a seal and a limit stop and keep the bearing support 3, 3', 4 under pretension, and hence prevent axial play, even when heavily loaded under operating conditions. Advantageously, an elastomer (e.g., PUR or rubber) with a large self-lubricating fraction can be used with the formed parts 3, 3', because there are no problems associated with adhesion to the inner sleeve 1. The sliding characteristic of the formed parts 3, 3' is improved by using a material with a large self-lubricating fraction. When using rubber, the permanent set is also smaller than with PUR or plastic.

The invention claimed is:

1. An elastomeric bush bearing having axial bearing ends and comprising
    an inner sleeve formed as a hollow cylinder,
    a sleeve-like outer element concentrically or eccentrically surrounding the inner sleeve,
    an elastomeric bearing support disposed between the inner sleeve and the outer element and comprising an inner bearing support and an outer bearing support,
    at least one inner element extending in the peripheral and axial direction enclosed between the inner bearing support and the outer bearing support, said inner bearing support being formed of at least one elastomeric formed part and including a peripheral bead disposed at the axial bearing ends and having a radial groove, and
    an annular disk comprising a radially extending outer shoulder and abutting an inner contour of the inner sleeve by a press fit, said outer shoulder engaging in the radial groove,
    wherein the inner bearing support is inserted from one axial end of the support between the inner sleeve and the inner element which is connected with the outer bearing support, and
    wherein the at least one formed part forms respective slide planes for the inner sleeve and the inner element and is held under pretension by the annular disk.

2. The elastomeric bush bearing according to claim 1, wherein the peripheral bead has a radially inwardly protruding, U-shaped edge that defines the radial groove and forms an external boundary for the annular disk.

3. The elastomeric bush bearing according to claim 2, wherein the annular disk includes a cylindrical portion and an annular portion, said annular portion including an annular shoulder formed by the radially extending outer shoulder, and wherein the cylindrical portion of the annular disk is pressed into the inner sleeve.

4. The elastomeric bush bearing according to claim 1, wherein the inner bearing support comprises two identical elastomeric formed parts secured between the inner sleeve and the inner element, each of the formed parts being pushed from a corresponding axial bearing end onto the inner sleeve and pretensioned relative to each other, wherein the formed parts are supported by the annular disks that are pressed onto the bearing ends.

5. The elastomeric bush bearing according to claim 4, wherein each of the formed pans is made of rubber having a self-lubricating fraction.

6. The elastomeric bush bearing according to claim 1, wherein the at least one formed part is made of an elastomer with a high self-lubricating fraction.

7. The elastomeric bush bearing according to claim 1, wherein the at least one inner element comprises an aluminum sheet or plastic.

8. The elastomeric bush bearing according to claim 1, wherein the at least one formed part is made of rubber having a high self-lubricating fraction.

9. The elastomeric bush bearing according to claim 1, wherein the at least one inner element includes an outwardly oriented edge encompassing the outer bearing support.

10. The elastomeric bush bearing according to claim 1, wherein the inner element is connected with the outer bearing support through vulcanization.

11. The elastomeric bush bearing according to claim 1, wherein the inside or outside, or both, of the at least one formed part includes honeycombs, in which a lubricant is introduced, and wherein the annular disk or disks form a seal which prevents the lubricant from exiting the bearing.

12. The elastomeric bush bearing according to claim 11, wherein the lubricant comprises grease.

* * * * *

UNITED STATES PATENT AND TRADEMARK OFFICE
CERTIFICATE OF CORRECTION

PATENT NO. : 7,367,551 B2
APPLICATION NO. : 11/142097
DATED : May 6, 2008
INVENTOR(S) : Kümper It is certified that error appears in the above-identified patent and that said Letters Patent is hereby corrected as shown below:

Column 1, Line 52, "BRIEF SUMMARY OR THE INVENTION" should read
-- BRIEF SUMMARY OF THE INVENTION --

Column 3, Line 36, "As seen in Fig. 2, the formed part 3 has the shaped of a hollow cylinder." should read -- As seen in Fig. 2, the formed part 3 has the shape of a hollow cylinder. --

Column 4, Line 54, "The elastomeric bush bearing according to claim 4, wherein each of the formed pans is made of rubber having a self-lubricating fraction." should read -- The elastomeric bush bearing according to claim 4, wherein each of the formed parts is made of rubber having a self-lubricating fraction. --

Signed and Sealed this

Sixteenth Day of September, 2008

JON W. DUDAS
*Director of the United States Patent and Trademark Office*